Dec. 20, 1927.
W. E. BROWN
1,653,387
STORAGE TANK FOR VOLATILE LIQUIDS
Filed Aug. 6, 1924    2 Sheets-Sheet 1
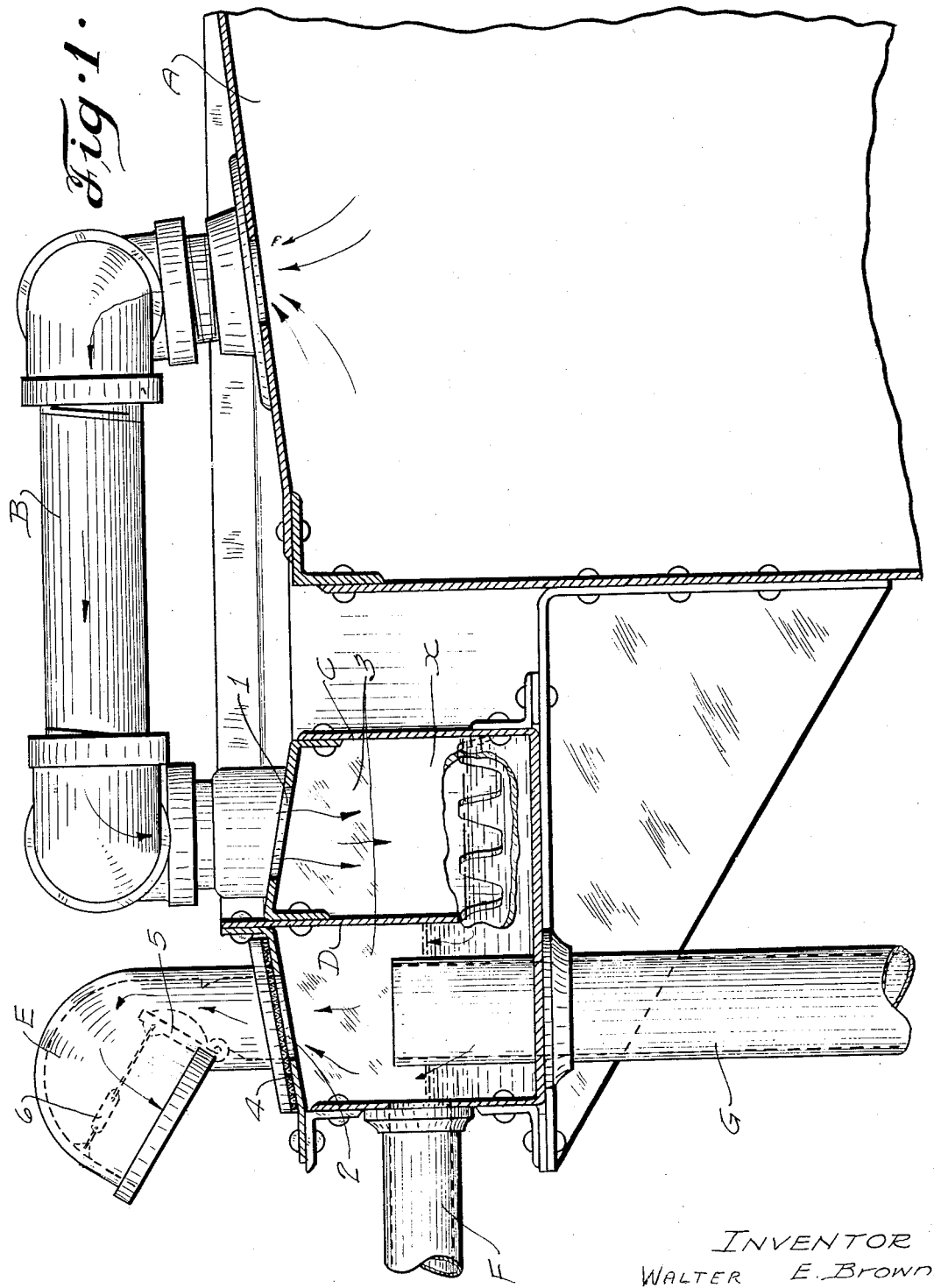

Dec. 20, 1927.
W. E. BROWN
1,653,387
STORAGE TANK FOR VOLATILE LIQUIDS
Filed Aug. 6, 1924    2 Sheets-Sheet 2
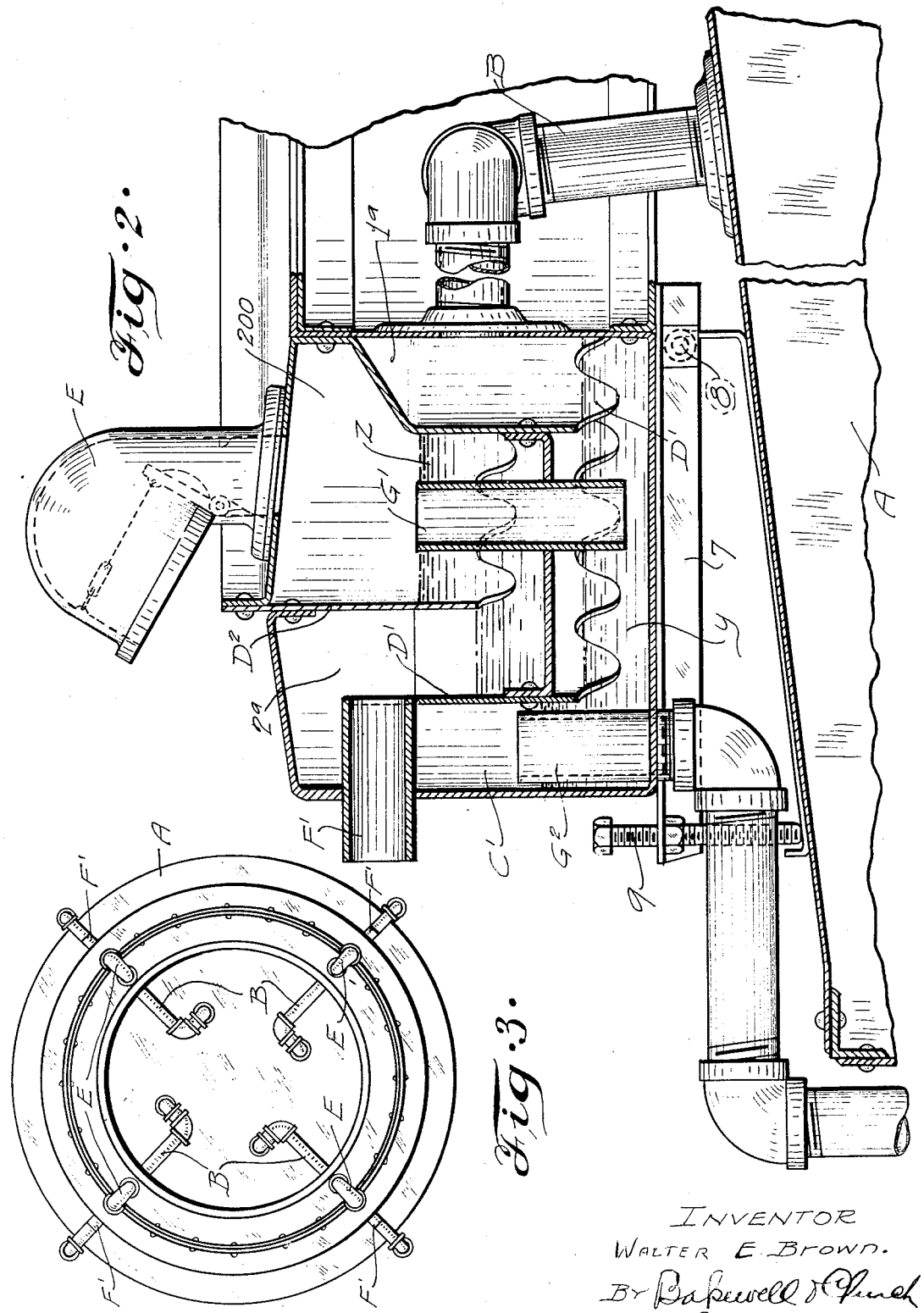
INVENTOR
WALTER E. Brown.
By Bakewell & Cornwell
ATTORNEYS Patented Dec. 20, 1927.

1,653,387

UNITED STATES PATENT OFFICE.

WALTER E. BROWN, OF KANSAS CITY, MISSOURI, ASSIGNOR TO UNITED IRON WORKS, INC., OF KANSAS CITY, MISSOURI, A CORPORATION OF MISSOURI.

STORAGE TANK FOR VOLATILE LIQUIDS.

Application filed August 6, 1924. Serial No. 730,526.

This invention relates to containers of the kind that are used for storing large quantities of crude oil, gasolene and other volatile liquids, and has for its main object to provide a storage tank or container that is equipped with an efficient means of novel construction for recovering the valuable constituents of the gases and vapors evolved in the tank by the evaporation of the liquid therein.

Figure 1 of the drawings is a vertical transverse sectional view of a portion of a liquid storage tank or container constructed in accordance with my invention.

Figure 2 is a vertical transverse sectional view, illustrating a storage tank or container that embodies the essential characteristics of the tank shown in Figure 1, but which is particularly adapted for storing liquids that are highly volatile, such as gasolene; and Figure 3 is a top plan view, on a reduced scale, of a storage tank or container constructed in accordance with my invention.

Referring to the drawings which illustrate two different forms of my invention, A in Figure 1 designates a tank or container that is adapted to be used for storing a large quantity of a volatile liquid, and B designates one or a plurality of vent pipes that lead from the upper portion of said tank so as to carry off the gases and vapors produced by the evaporation of the liquid in the tank. Instead of permitting said gases and vapors to escape directly into the atmosphere, thus causing considerable loss, due to the fact that said gases contain valuable constituents, I provide the tank with an apparatus that causes the escaping gases or vapors to bubble through a liquid that absorbs or condenses the valuable constituents of the escaping gases, said absorbing liquid either being subsequently treated so as to effect the recovery of the valuable consituents of the gases that have been absorbed by said liquid, or being conducted to the tank A and mixed with the liquid stored therein. The apparatus just referred to can be formed in various ways without departing from the spirit of my invention. In the embodiment of my invention illustrated in Figure 1 said apparatus comprises a closed casing C whose lower portion serves as a trough for a body of absorbing liquid $x$ that circulates through said trough, and whose upper portion is divided by a baffle D into a chamber 1, which I will refere to as an intake chamber, and a chamber 2, which I will refer to as a discharge chamber. The vent pipes B that lead from the tank A communicate with the intake chamber 1 of the casing C at a point above the level of the liquid $x$ in said casing, and the discharge chamber 2 is provided with one or more air vents E that lead to the atmosphere. Any suitable means can be used to cause the absorbing liquid $x$ to circulate through the casing C and be maintained at such a level as to keep the lower edge portion of the baffle D submerged, and in the form of my invention herein illustrated a suitable absorbing liquid is supplied to the casing C by a supply pipe F and is conducted away from said casing through a discharge pipe G whose upper end terminates inside of the casing C at a point high enough above the bottom of the casing to maintain the liquid $x$ at such a level as to keep the lower edge portion of the baffle D submerged, thereby causing the gases or vapors that escape from the tank A through the vent pipe or pipes B to bubble through the liquid $x$, in passing from the receiving or intake chamber 1 of the casing C to the discharge chamber 2 in said casing under the bottom edge of the baffle D. The liquid $x$ in the casing C may either consist of liquid of the same kind as the liquid stored in the tank A, or it may consist of any suitable low gravity liquid that is capable of absorbing and condensing the valuable constituents of the gases and vapors produced by the evaporation of the liquid in the tank A. Usually liquid will be drawn from a cool part of the tank A into the supply pipe F by a suitable means (not shown), and after the liquid $x$ has remained in the casing C for a certain approximate time, it will be returned to the tank A through the overflow pipe G, which overflow pipe may, if desired, be equipped with a trap.

The particular form and arrangement of the casing C is immaterial, but I prefer to use a casing C of substantially annular form and arrange a transverse partition D inside of same at a point between the liquid supply pipe F and the overflow pipe G, so as to cause the liquid $x$ to circulate circumferentially of the casing C, the tank A being provided with a plurality of vent pipes B that discharge into the receiving chamber or intake chamber 1 of the casing C. The air vent or vents E that lead from the discharge chamber 2 of the casing C are preferably each provided with a piece of wire gauze 4 arranged transversely of the passageway of same, and if desired, each of said vents can be equipped with a pivotally mounted flame snuffer 5 that is normally held in an open position by means of a fusible link 6, which, in the event of a fire in proximity to the tank, will rupture, and thus permit said flame snuffer to move into its closed position. As shown in Figure 1, the bottom edge of the baffle D is preferably serrated so as to cause the escaping gases and vapors, in passing under said baffle, to agitate the absorbing liquid $x$ sufficiently to prevent sediment or foreign matter in said liquid from collecting in the bottom of the casing C, and said baffle D is so arranged that insoluble gases will collect in the intake chamber above the surface of the liquid until a sufficient pressure has been attained to force the level of the liquid in the intake chamber down to a point just below the edge of said baffle, after which the insoluble gases will bubble through the liquid and enter the discharge chamber.

With a storage tank or container of the construction above described the valuable constituents in the gases and vapors that are evolved by the evaporation of the liquid in the tank A are recovered by absorption or condensation in liquid $x$ that circulates through the casing C, for when said gases and vapors escape from the tank A, they enter a liquid sealed chamber from which they can escape only by passing under the lower edge of the baffle D and bubbling up through the liquid $x$ into the discharge chamber 2 of the casing C, which is vented to the atmosphere, the absorbing liquid $x$ after it has become saturated, or after it has remained in the casing C for a certain approximate time, being returned to the tank A or being subjected to such treatment as to effect the recovery of the valuable constituents of the gases absorbed by same.

The tank or container A shown in Figure 2 embodies the same desirable features and characteristics of the tank shown in Figure 1, but it is particularly adapted for storing gasolene and other liquids that are highly volatile, due to the fact that it is equipped with an apparatus which is of such design that the gases or vapors produced by the evaporation of the liquid in the tank A, will have to bubble through a plurality of bodies of absorbing liquid before reaching the atmosphere. As shown in Figure 2, the tank A is equipped with a closed casing C', preferably of annular form, whose interior is divided by partitions in such a way as to form a bottom trough that holds a body of absorbing liquid $y$ and a top trough that holds a body of absorbing liquid $z$. The liquid $y$ in the bottom trough is used to seal a receiving chamber or intake chamber $1^a$ from a discharge chamber $2^a$, and the liquid $z$ in the top trough is used to seal said discharge chamber $2^a$ from a final discharge chamber 200 that is connected with the atmosphere by one or more air vents E similar to those used in the apparatus illustrated in Figure 1, the chambers $1^a$ and $2^a$ each having a baffle or side wall portion D' whose lower edge portion is submerged in the liquid $y$ in the bottom trough, and the discharge chamber $2^a$ is separated from the final discharge chamber 200 by a baffle $D^2$ whose lower edge portion is submerged in the liquid $z$ in the top trough. A suitable absorbing liquid is supplied to the top trough of the casing C' by a supply pipe F' that discharges into the chamber $2^a$, and after said liquid has circulated circumferentially of the top trough, it escapes from same into the bottom trough through an overflow pipe G' that maintains the liquid in said top trough at a level high enough to keep the lower edge portion of the baffle $D^2$ submerged. The liquid $y$ in the bottom trough is maintained at a certain approximate level by an overflow pipe $G^2$ whose upper end terminates at such a point with relation to the baffles D' to keep the lower edge portions of said baffles submerged. If desired, the casing C' can be supported by adjustable supports 7 that are adapted to be raised and lowered so as to maintain the casing C' in an absolutely level condition, the supports 7 herein illustrated being provided at their inner ends with pivots 8 and provided at their outer ends with adjusting devices 9 that can be manipulated to change the position of said supports during the operation of leveling up the casing C'. Obviously, an adjustable supporting structure of the kind above described could be used with the casing C of the tank shown in Figure 1.

The operation of the tank shown in Figure 2 is substantially the same as the operation of the tank shown in Figure 1, so far as the absorption or condensation of the valuable constituents of the escaping vapors and gases is concerned, but in the tank shown in Figure 2 the gases that escape from the tank A through the vents B enter a chamber $1^a$, then escape from said chamber into the chamber $2^a$ by bubbling through the liquid $y$ in the bottom trough, and finally escape from the chamber $2^a$ into the air vented chamber 200 by bubbling through the liquid $z$ in the top trough. Consequently, if the liquid contained in the tank A is of a highly volatile nature, such as gasolene, the fact that the escaping gases and vapors have to pass a plurality of times through bodies of absorbing liquid practically insures the recovery of the valuable constituents of said gases and vapors.

Having thus described my invention, what I claim as new and desire to secure by Letters Patent is:

1. An apparatus for storing liquids, comprising a tank or container for holding liquid, an outlet leading from the upper portion of said tank through which vapors and gases escape from the tank, a trough communicating with said outlet and provided with a body of absorbing liquid that circulates through the trough, means in said trough for causing the gases that enter the trough to bubble through the liquid in said trough, and means for maintaining the absorbing liquid in said trough at a certain approximate level.

2. An apparatus for storing liquids, comprising a tank or container for holding a liquid, an outlet from the upper portion of said tank through which the gases and vapors can escape, a passageway communicating with said outlet and provided with a body of absorbing liquid that circulates through said passageway, an outlet through which said liquid escapes from said passageway, means in said passageway for causing the gases that escape from the tank to bubble through the liquid in said passageway, and a vent leading from said passageway.

3. An apparatus for storing liquids, comprising a liquid tank or container, an annular casing constructed to serve as a liquid trough, means for causing liquid to circulate through said trough and then enter said tank, and an outlet leading from the upper portion of said tank for causing gases and vapors to escape from said tank and then bubble through the liquid in said trough.

4. An apparatus for storing liquids, comprising a liquid tank or container, a casing of substantially annular form constructed to serve as a liquid trough, means for supplying liquid to said trough, an overflow pipe leading from said trough, means for dividing the interior of said casing into a receiving chamber and a discharge chamber that are sealed from each other by the liquid in the trough, and means for permitting gases or vapors to pass from said tank into said receiving chamber.

5. An apparatus for storing liquids, comprising a liquid tank or container, an annular trough that is adapted to hold an absorbing liquid, means for causing gases or vapors that are evolved in said tank to pass from the tank and bubble through the liquid in said trough, and means for enabling said trough to be adjusted so as to maintain it in a level condition.

6. An apparatus for storing liquids, comprising a liquid tank or container, an annular casing constructed to form two superimposed liquid troughs that are adapted to contain an absorbing liquid, means for maintaining a certain approximate level of absorbing liquid in each of said troughs, and means for causing gases or vapors to pass from the upper portion of said tank through the absorbing liquid in both of said troughs and then escape to the atmosphere.

7. An apparatus for storing liquids, comprising a tank or container for holding a liquid, an annular casing, a plurality of liquid troughs in said casing, a receiving chamber and a discharge chamber associated with each of said troughs and sealed from each other by the liquid in the trough, a connection between one of said receiving chambers and the upper portion of said tank for permitting gases and vapors to pass from the tank into said receiving chamber, a liquid supply pipe leading to one of said troughs, and means for maintaining a certain approximate level of liquid in both troughs and for conducting liquid from one trough into the other.

8. An apparatus for storing liquids, comprising a tank or container for holding liquid, an annular casing arranged adjacent the upper end of said tank and provided with a receiving chamber, a discharge chamber, and a baffling means interposed between said chambers, means for causing an absorbing liquid to circulate through said casing and to remain at such a level as to hold said baffling means partly submerged in said absorbing liquid, and an outlet leading from the upper portion of said tank to said receiving chamber for permitting gases and vapors to pass from the tank into said receiving chamber.

WALTER E. BROWN.